United States Patent [19]

Muhlethaler

[11] Patent Number: 5,062,605

[45] Date of Patent: Nov. 5, 1991

[54] CABLE-LAYING CONDUIT

[75] Inventor: Erhard Muhlethaler, Schalunen, Switzerland

[73] Assignee: Lanz Oensingen AG, Oensingen, Switzerland

[21] Appl. No.: 393,735

[22] Filed: Aug. 15, 1989

[30] Foreign Application Priority Data

Aug. 17, 1988 [CH] Switzerland .......................... 3070/88

[51] Int. Cl.$^5$ ................................................. F16L 3/00
[52] U.S. Cl. ..................................... 248/68.1; 248/73; 248/243
[58] Field of Search ................... 248/68.1, 51, 243, 73, 248/249, 225.2, 220.2, 223.3, 909, 49; 211/187; 174/72 A, 101, 68.3

[56] References Cited

U.S. PATENT DOCUMENTS

| 799,092 | 9/1905 | Rosenfeld | 248/909 X |
|---|---|---|---|
| 1,992,574 | 2/1935 | Jenkins | 174/68.3 X |
| 2,891,750 | 6/1959 | Bergquist | 248/68.1 X |
| 3,024,301 | 3/1962 | Walch | 248/49 X |
| 3,060,069 | 10/1962 | Sindars | 174/68.3 X |
| 3,403,220 | 9/1968 | Riedel et al. | 174/101 |
| 4,319,724 | 3/1982 | Bradbury | 248/68.1 X |
| 4,344,368 | 8/1982 | Remington et al. | 211/187 X |

FOREIGN PATENT DOCUMENTS

| 0259725 | 3/1988 | European Pat. Off. | 248/49 |
|---|---|---|---|
| 2358863 | 5/1974 | Fed. Rep. of Germany | 248/49 |
| 2329234 | 5/1977 | France | 248/243 |

Primary Examiner—Karen J. Chotkowski
Attorney, Agent, or Firm—Browdy and Neimark

[57] ABSTRACT

On the cable-laying conduit of rectangular and square cross section, the longitudinal opening for insertion of the cable is disposed in one corner of the conduit cross section. The opening is formed by shortening the two abutting conduit sides. At least three of the four conduit sides have outer fastening strips, extending parallel in the longitudinal direction, for installing the conduit. When the conduit is embodied as a grid structure with longitudinal members and transverse members, two side segments each pointing toward one corner are shortened, inorder to form the longitudinal opening. An embodiment as an extruded profile, for instance of plastic, is also possible. The disposition of the fastening strips or longitudinal members in a spacing pattern is suitable for installation by means of hooked brackets.

16 Claims, 4 Drawing Sheets

CABLE-LAYING CONDUIT

BACKGROUND OF THE INVENTION

1. Field of the Invention

The invention relates to a cable-laying conduit for building insulation, having a substantially rectangular or square cross section and having a longitudinal opening for the insertion of the cable.

2. The Prior Art

Cable-laying conduits of this kind are needed in medium size and larger plants (multiple-family houses, commercial and industrial buildings, public buildings, etc.) for the orderly laying of cables and lines of the most various kinds. A rational and versatile way of installing the conduit segments on the building—on ceilings, walls, pillars, brackets, etc.—would be highly desirable, while naturally the longitudinal opening on the installed conduit must always remain accessible. With known products, whether in the form of plastic profiles, perforated plates bent at an angle, or plasticized wire grids, these demands are met only inadequately.

SUMMARY OF THE INVENTION

Accordingly, the object of the present invention is to create a cable-laying conduit that can be produced at economical cost with various profile shapes and sizes (preferably as a modular system) and that offers versatile and practical fastening options.

This object is attained in accordance with the present invention by forming the longitudinal opening of the conduit in one corner of the conduit cross section by shortening the two abutting sides of the conduit, and by providing at least three of the four sides of the conduit with fastening strips located on the outside, extending parallel in the longitudinal direction, for installation of the conduit. This makes it possible to install the cable laying conduit—and even a plurality of conduits beside one another—in various locations relative to the building, and in any situation that might arise in practice; the accessibility of the longitudinal openings is assured, and the full internal cross section of the conduit can be utilized.

Further features of the present invention are described in the dependent claims. Still other objects, features and attendant advantages of the present invention will become apparent to those skilled in the art from a reading of the following detailed description of the embodiments constructed in accordance therewith, taken in conjunction with the accompanying drawing.

BRIEF DESCRIPTION OF THE DRAWINGS

Exemplary embodiments of the cable-laying conduit according to the invention will now be described in detail in conjunction with the drawings, in which.

DETAILED DESCRIPTION OF THE EMBODIMENT

Figure 1:
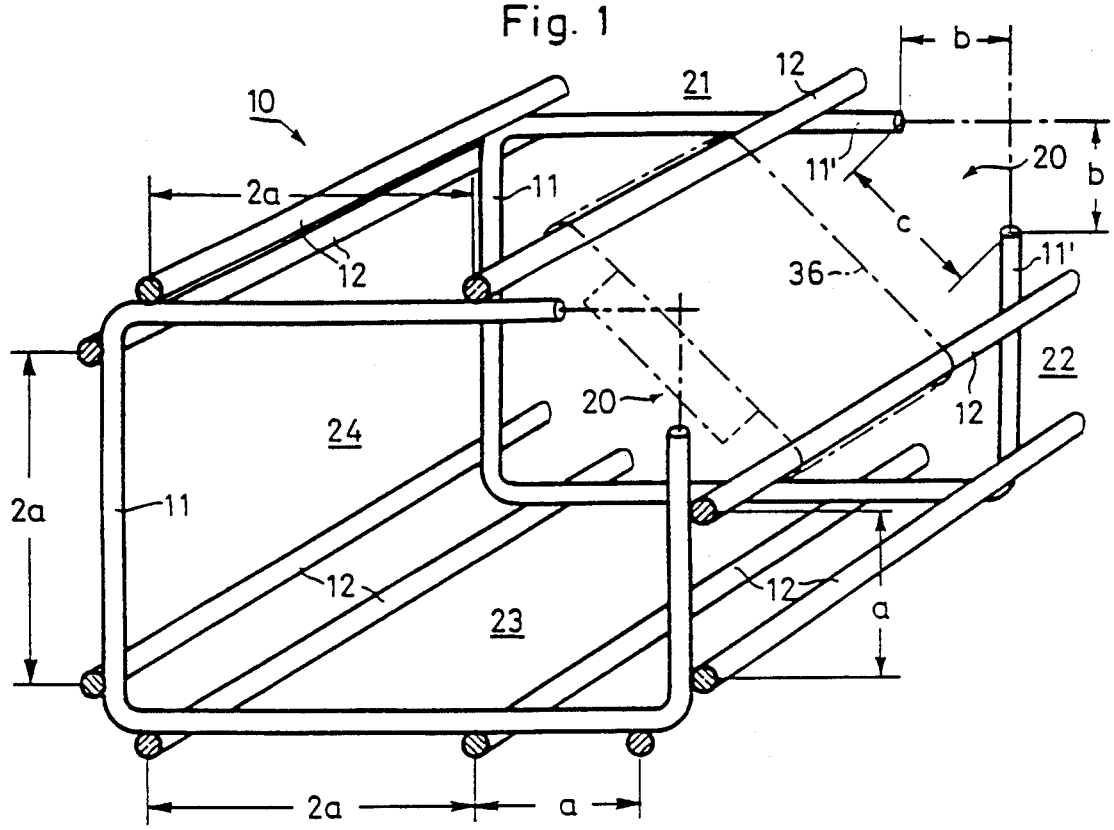
FIG. 1 is a perspective view of a conduit segment produced in the form of a grid structure with longitudinal and transverse members.

The segment of a cable-laying conduit shown in FIG. 1 is embodied by a grid structure in a manner known per se, preferably of steel wires welded together and plasticized. The longitudinal members 12 extending in the longitudinal direction of the conduit are joined at regular intervals by means of transverse members 11, which determine the conduit cross section, which in this case is substantially rectangular. As can be seen, the longitudinal members 12 intersect the transverse members 11, in each case on the outside of the conduit. In the present example, there are three longitudinal members 12 located on the conduit side 23, while the other conduit sides 21, 22 and 24 each have two longitudinal members. The outside longitudinal members 12 have the function of fastening strips, with which the conduit can be installed on the building, preferably by using special hooked brackets, as described in further detail below in conjunction with FIG. 4. For this reason, the spacing of the longitudinal members 12 located on one conduit side is selected such that the spacing is equivalent either to a basic dimension, a (side 22 and side 23, right), or an integral multiple thereof, 2a (sides 21, 23 left and 24).

An essential feature of the cable-laying conduit is also that the longitudinal opening 20 for insertion of the cable is formed in one corner of the conduit cross section by shortening the two abutting conduit sides 21 and 22; in the case of the grid structure of FIG. 1 the opening 20 is created by shortening two side segments 11', each segment pointing toward one corner, of the transverse members 11 by a dimension b, as indicated by dot-dash lines, in order to form the opening having the width c (the extent of the shortening may also be different on the two segments 11').

Figure 2:
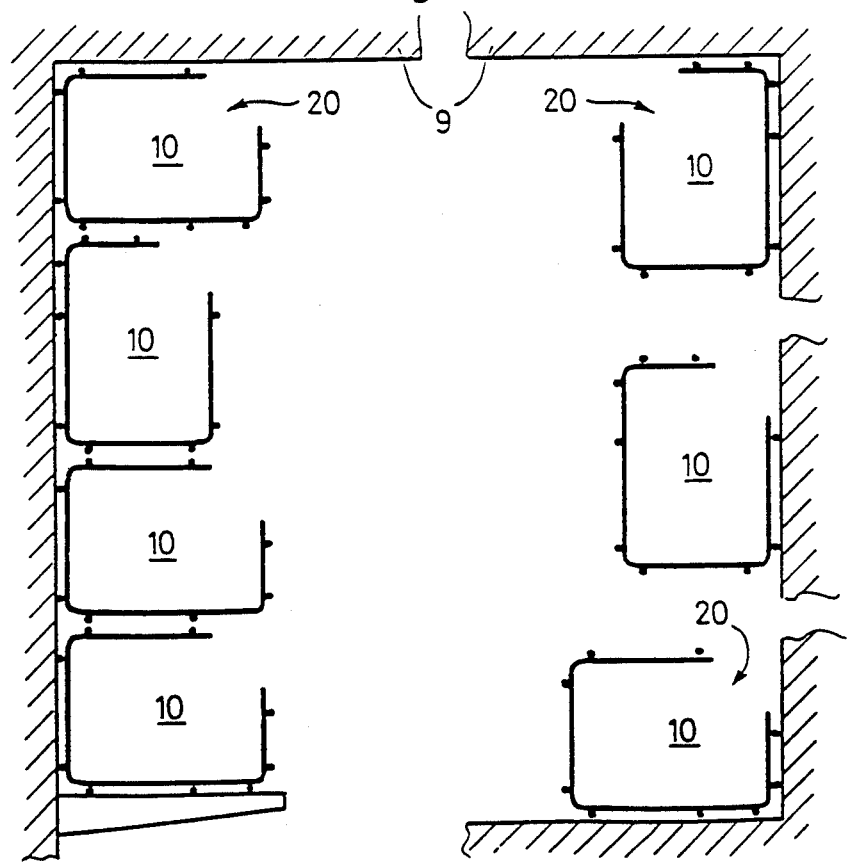
FIG. 2 shows the conduit profile of FIG. 1 (on a smaller scale) in various arrangements with respect to a building.
Figure 3A:
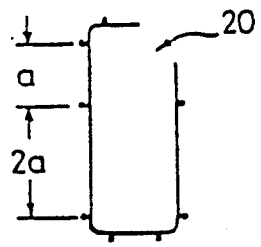
FIGS. 3a–3f schematically shows a number of different cross-sectional forms, including those of FIG. 1, which form a modular system, based on a uniform spacing of the fastening strips.
Figure 3D:
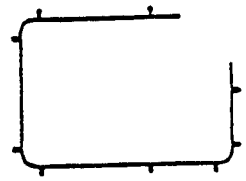
Figure 3B:
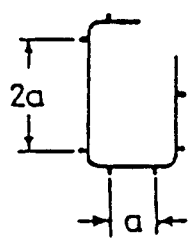
Figure 3E:
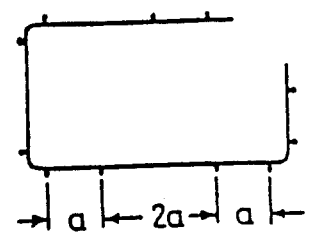
Figure 3C:
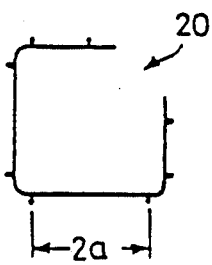
Figure 3F:
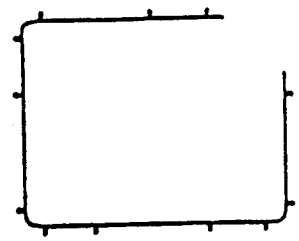

As can be seen from FIG. 2, a conduit having these characteristics can be installed in the most various positions with respect to the walls and ceilings of a building 9, and the longitudinal opening 20 (normally located in one of the upper corners of the cross section) always remains accessible, even with conduits installed flush one above the other, as can be seen on the left in FIG. 2. FIG. 2 can also be looked at as a horizontal section through the building 9, with vertically extending conduits 10.

Although special fastening means for installing the conduits on the building are not shown in FIG. 2, it can be seen that the fastening always takes place on the outer fastening strips or longitudinal members 12. As a result, the interior of the conduit remains free, and even in the installation operation, no tools need to be passed through the interior of the conduit, at least when hooked brackets as shown in FIG. 4 are used.

While maintaining a spacing pattern between the fastening strips 12 having the basic length a, it is possible to form a number of rectangular and square conduit cross sections of different sizes as needed; some examples are schematically shown together in FIG. 3. Normally, all four conduit sides each have two or more fastening strips 12, but in the case of narrow rectangular cross sections, only one fastening strip may be present on one narrow side, bordering the opening 20 (shown on the left in FIG. 3). The various profiles of FIG. 3 can naturally be installed in equally versatile arrangements, as shown in FIG. 2.

Figure 4:
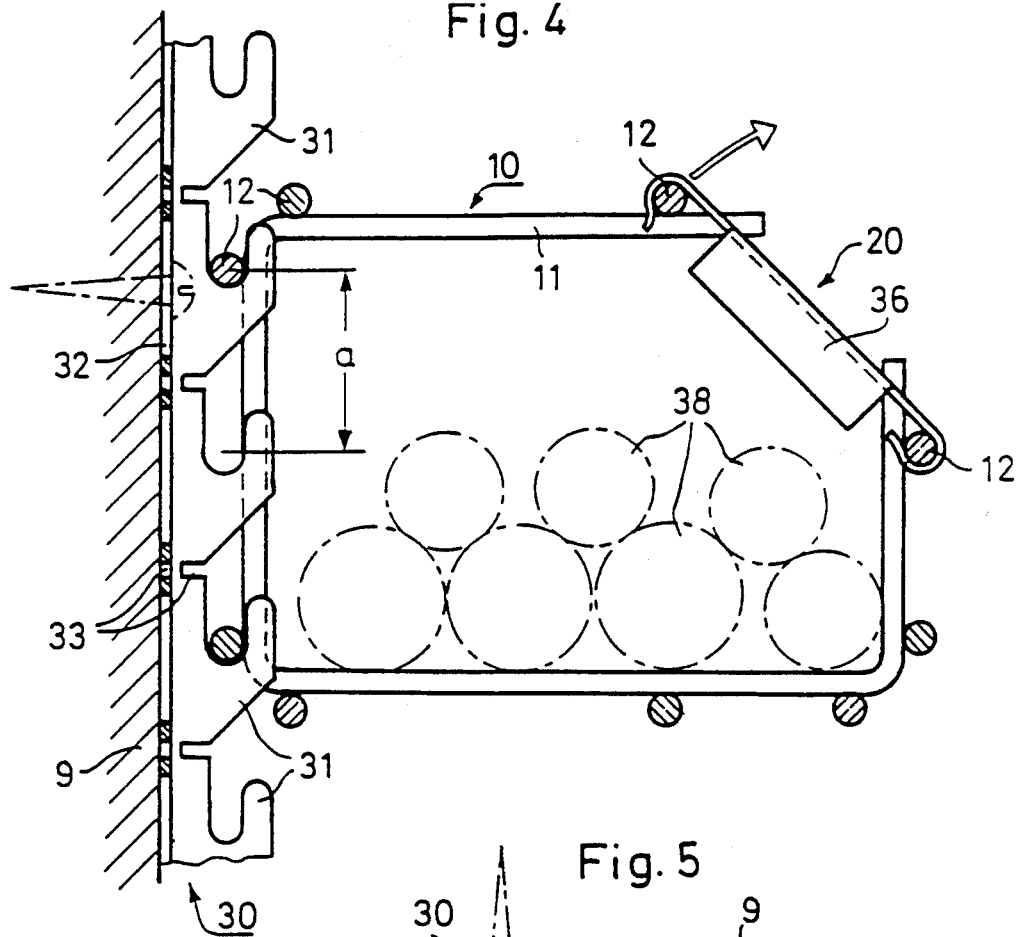
FIG. 4 is a sectional view of an installation arrangement with a cable-laying conduit mounted by means of a hooked bracket.
Figure 5:
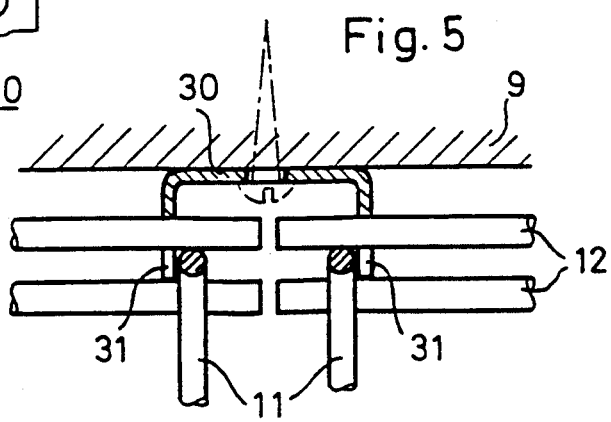
FIG. 5, again in section, shows a preferred cross-sectional shape of the hooked bracket, which makes a butt joint of two successive conduit segments possible.

A particularly suitable manner of installation with the aid of mounting rails 30 is illustrated in FIGS. 4 and 5. The mounting rail 30, provided with slits 32 for wall installation, has at least one row of hooks 31 for receiving fastening strips 12 of a conduit 10, the hooks 31 being disposed at regular intervals in accordance with the basic dimension a of the strip spacing. In this way, conduits 10 can easily be installed by hanging fastening strips 12 on an arbitrary side of the conduit. It may be suitable for the hooks 31, or the suspension slits formed by them, to be made slightly narrower in the entry region, to produce a certain detent effect when the strips 12 are suspended, to protect the conduit 10 from being unintentionally removed. It is suitable for the mounting rail to have rated breaking points 33 between successive hooks 31, so that it is easy to cut off suitable lengths of rail during installation.

It is particularly suitable to embody the mounting rail 30 as a U-shaped profile, as shown in FIG. 5, with its legs forming two parallel rows of hooks 31. The spacing between the legs of the U, or rows of hooks, can then be dimensioned as shown in FIG. 5 in such a way that between them, two transverse members 11 of two different conduit segments can be inserted. Each of these transverse members 11 then forms the end region (for instance with slightly protruding longitudinal members 12), each of one conduit segment. In this way, the mounting rail 30 simultaneously acts as a means of attachment to the wall and as a means of butt-joining successive conduit segments.

It often becomes necessary for the cable 38 (shown in dot-dash lines in FIG. 4) inserted into the conduit to be secured against falling out. For this purpose, capping devices 36, for instance in the form of bent sheet-metal parts which span the opening 20 at regular intervals (see also FIG. 1), may be provided. As shown FIG. 4, a capping device 36 of this kind can be suspended via the two longitudinal members 12 defining the longitudinal opening 20 and may be pivotable in the direction of the arrow.

Figure 6:
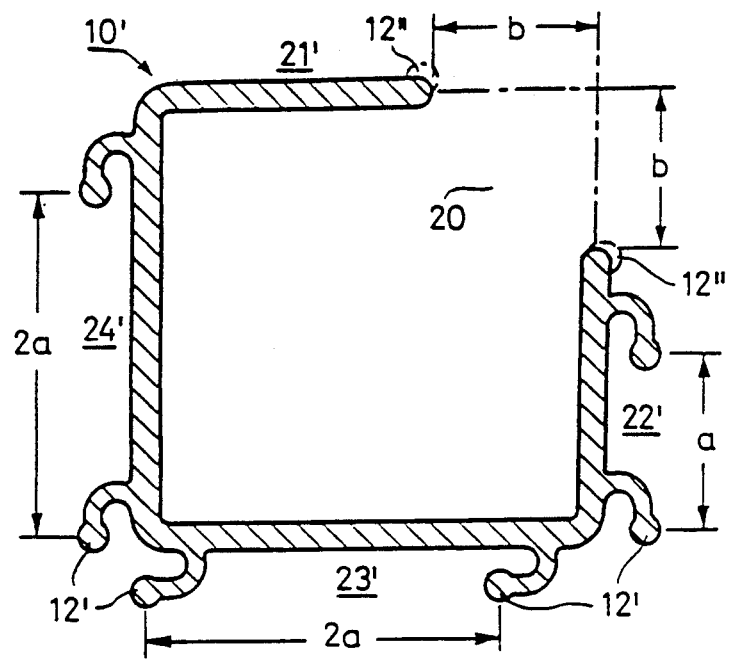
FIG. 6 is a sectional view of a further exemplary embodiment of a conduit in the form of an extruded plastic profile.

Instead of the grid structure, the cable-laying conduit may also be embodied as an extruded profile, particularly of plastic, as the example of a substantially square profile 10' of FIG. 6 shows. Once again, the longitudinal opening 20 for inserting the cable is formed in one corner of the conduit cross section, in that both abutting conduit sides 21' and 22' are shortened by a dimension b (or by different dimensions). The three conduit sides 22', 23' and 24' are provided with formed-on fastening strips 12' extending parallel in the longitudinal direction. The two strips 12' located on any one side are again spaced apart by either the distance a or twice that distance 2a. As a result, the same mounting strips or rails 30 described in conjunction with FIGS. 4 and 5 (or other fastening means located on the outside) may be used. For disposing the capping devices spanning the longitudinal opening 20, profile rims, such as beads 12", defining the opening 20 may be provided.

Figure 7:
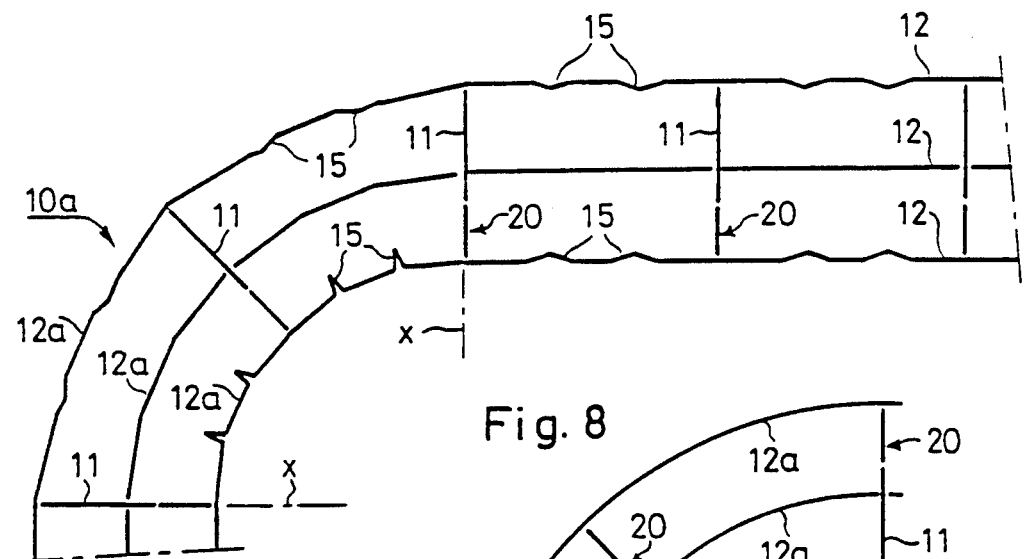
FIG. 7, for a conduit segment embodied as a grid structure, shows one option for forming conduit bends.

The exemplary embodiment schematically shown in FIG. 7 again relates to a conduit segment in the form of a grid structure. The particular feature of this example is that a portion of the longitudinal members 12 can be provided with buckling notches 15 at regular intervals between each two transverse members 11. These buckling notches, by bending farther inward on one side and stretching apart on the other, make it possible to bend a conduit section 10a approximately into the shape of a quarter circle, which is often desirable when installing the cable-laying conduit in corners of rooms. The bending may be performed in such a way that two transverse members 11 come to rest in planes x at right angles to one another, but this is not compulsory. Bends other than rectangular ones may naturally be produced instead, depending on the needs of the particular installation. As indicated in FIG. 7, the longitudinal opening 20 may extend along either the inside or the outside of the bend.

Figure 8:
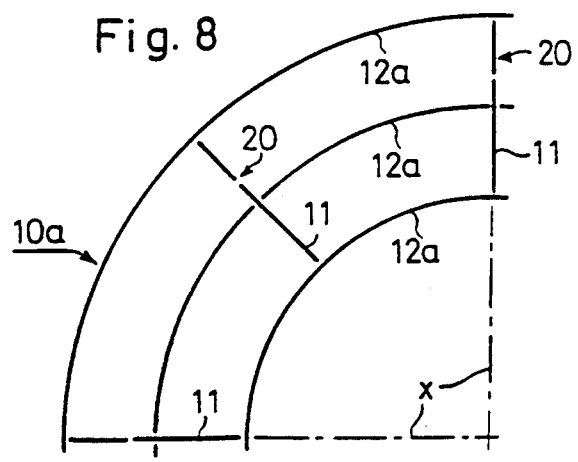
FIG. 8, in a similar view, shows a conduit elbow produced as a ready-made part.

FIG. 8, contrarily, shows a curved conduit segment 10a made as a ready-made part, the long members 12a of which are bent substantially into a quarter circle, and in which again two transverse members 11 are located in planes x at right angles to one another. Prefabricated conduit elbows of this kind can be particularly suitably fastened with mounting rails 30 of U-profile as shown in FIG. 5 and connected to adjoining (straight or curved) conduit segments.

Curved pieces or elbows of this type can naturally be used horizontally or vertically as needed. Other shapes of pieces, especially T-shaped branch pieces and the like can be made in a similar manner—adapted in cross section to straight conduit segments—and the position and course of the continuous longitudinal opening can be selected depending on the particular need. Finally, prefabricated shaped conduit pieces for connection to straight conduit segments can also be made of plastic.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A cable-laying conduit for building installation, said conduit having a rectilinear lateral cross-section, the improvement comprising:
    a conduit having four sides and three corners; and
    a longitudinal opening for insertion of cable located along the projected intersection of two of said sides of said conduit which are shorter than their opposite sides.

2. A cable-laying conduit as defined by claim 1, further comprising fastening strips located on the outside of at least three of the four sides and extending parallel in the longitudinal direction for conduit installation, wherein said fastening stips comprise at least two fastening stips per conduit side, and wherein the spacing of the strips loated on one side is equal to a basic dimension or an integral multiple thereof.

3. A cable-laying conduit as defined by claim 2, further comprising a mounting rail having at least one row of hooks for receiving said fastening strips of the conduit, wherein the hooks are disposed at regular intervals corresponding to the basic dimension of the strip spacing.

4. A cable-laying conduit as defined by claim 3, wherein the mounting rail is provided with rated breaking points, one between each of successive hooks.

5. A cable-laying conduit as defined by claim 3, wherein the mounting rail has a U-shaped profile, the legs of the U forming two parallel rows of said hooks.

6. A cable-laying conduit as defined by claim 5, formed by a grid structure comprising longitudinal members and transverse members joining the longitudinal members and defining the conduit cross section, wherein the longitudinal opening is formed by shortening two side segments, and the fastening strips are formed by outer ones of the longitudinal members.

7. A cable-laying conduit as defined by claim 6, wherein the spacing between the legs of the U of the mounting rail is dimensioned such that between them, two of the transverse members inserted into the space between said two parallel rows of hooks.

8. A cable-laying conduit as defined by claim 1, further comprising removable capping devices for spanning the longitudinal opening.

9. A cable-laying conduit as defined by claim 1, formed by a grid structure comprising longitudinal members and transverse members joining the longitudinal members and defining the conduit cross section, wherein the longitudinal opening is formed by shortening two side segments, each pointing toward one corner, of the transverse members, and fastening strips are formed by outer ones of the longitudinal members.

10. A cable-laying conduit for building installation in accordance with claim 1, wherein said opening extends to the full length of said conduit.

11. A cable-laying conduit for building installation in accordance with claim 1, further comprising fastening strips located on the outside of at least three of the four conduit sides and extending parallel in longitudinal direction for the conduit installation.

12. A cable-laying conduit for building installation in accordance with claim 1, wherein said conduit is formed by a grid section comprising longitudinal members and lateral members adjoining the longitudinal members and defining the conduit cross section.

13. A cable-laying conduit for building installation in accordance with claim 1, wherein said longitudinal opening extends a distance b laterally into each adjoining side, from said projected intersection of two sides wherein said longitudinal opening is located.

14. A cable-laying conduit for building installation in accordance with claim 1, wherein said longitudinal opening has a width c which forms the hypotenuse of a right triangle and wherein the right angle is the said projected intersection of two sides of said conduit.

15. A cable-laying conduit for building installation in accordance with claim 1, wherein said longitudinal opening extends laterally into two adjacent spaces of said conduit.

16. A cable-laying conduit for building installation in accordance with claim 1, wherein said triangle is an isosceles triangle.

* * * * *